(12) United States Patent
Fei et al.

(10) Patent No.: US 9,858,722 B2
(45) Date of Patent: Jan. 2, 2018

(54) SYSTEM AND METHOD FOR IMMERSIVE AND INTERACTIVE MULTIMEDIA GENERATION

(71) Applicant: USENS, INC., San Jose, CA (US)

(72) Inventors: Yue Fei, San Jose, CA (US); Anli He, San Jose, CA (US)

(73) Assignee: USENS, INC., San Jose, CA (US)

( * ) Notice: Subject to any disclaimer, the term of this patent is extended or adjusted under 35 U.S.C. 154(b) by 0 days.

(21) Appl. No.: 14/923,073

(22) Filed: Oct. 26, 2015

(65) Prior Publication Data
US 2016/0117860 A1  Apr. 28, 2016

Related U.S. Application Data

(60) Provisional application No. 62/068,423, filed on Oct. 24, 2014.

(51) Int. Cl.
| | |
|---|---|
| G06T 15/00 | (2011.01) |
| G06T 19/00 | (2011.01) |
| G06F 3/01 | (2006.01) |
| G06F 3/14 | (2006.01) |
| G06F 3/16 | (2006.01) |
| G06K 9/00 | (2006.01) |
| G06K 9/46 | (2006.01) |
| H04N 5/225 | (2006.01) |

(Continued)

(52) U.S. Cl.
CPC ........... *G06T 19/006* (2013.01); *G06F 3/017* (2013.01); *G06F 3/14* (2013.01); *G06F 3/16* (2013.01); *G06K 9/00355* (2013.01); *G06K 9/4676* (2013.01); *G06T 7/74* (2017.01); *H04N 5/2258* (2013.01); *H04N 5/332* (2013.01); *G06T 2207/10012* (2013.01); *G06T 2207/20164* (2013.01); *G06T 2207/30244* (2013.01); *G06T 2215/16* (2013.01)

(58) Field of Classification Search
CPC ................................. G06T 19/00; G06T 17/20
USPC ........................................................ 345/419
See application file for complete search history.

(56) References Cited

U.S. PATENT DOCUMENTS

| | | |
|---|---|---|
| 8,840,250 B1 | 9/2014 | Yao et al. |
| 8,970,693 B1 | 3/2015 | Chang et al. |

(Continued)

OTHER PUBLICATIONS

Search Report and Written Opinion for International Application No. PCT/US2016/020730, dated Jul. 8, 2016, 22 pages.

(Continued)

*Primary Examiner* — Jin Ge

(57) ABSTRACT

An apparatus is disclosed. The apparatus comprises an optical sensing system that comprises at least one camera, the at least one camera being configured to acquire an image of a physical environment. The apparatus further comprises a processing system. The processing system comprises an orientation and position determination module configured to detect salient features from the image, and determine a change in orientation and/or position of the apparatus with respect to the physical environment based on the detected salient features. The processing system also comprises a rendering module configured to determine a rendering of the physical environment based on the image and on the determined change in orientation and/or position of the apparatus, and provide data related to the rendering of the physical environment to a display system.

20 Claims, 12 Drawing Sheets

(51) Int. Cl.
*H04N 5/33* (2006.01)
*G06T 7/73* (2017.01)

(56) References Cited

U.S. PATENT DOCUMENTS

| | | |
|---|---|---|
| 9,459,454 B1 | 10/2016 | The et al. |
| 9,599,818 B2 | 3/2017 | Yamagishi |
| 2008/0266326 A1 | 10/2008 | Porwal |
| 2010/0121480 A1 | 5/2010 | Stelzer |
| 2012/0092328 A1 | 4/2012 | Flaks et al. |
| 2012/0306850 A1* | 12/2012 | Balan .................... G06T 19/006 345/419 |
| 2013/0050432 A1 | 2/2013 | Perez et al. |
| 2013/0194259 A1 | 8/2013 | Bennett et al. |
| 2013/0222369 A1* | 8/2013 | Huston .................. G06T 17/00 345/419 |
| 2013/0223673 A1* | 8/2013 | Davis ..................... G06K 9/78 382/100 |
| 2013/0282345 A1* | 10/2013 | McCulloch ........... G06T 19/006 703/6 |
| 2013/0328928 A1 | 12/2013 | Yamagishi |
| 2013/0335301 A1 | 12/2013 | Wong et al. |
| 2014/0002442 A1 | 1/2014 | Lamb et al. |
| 2014/0152558 A1 | 6/2014 | Salter et al. |
| 2014/0287806 A1 | 9/2014 | Balachandreswaran |
| 2014/0306866 A1 | 10/2014 | Miller et al. |
| 2014/0306875 A1 | 10/2014 | He et al. |
| 2014/0354602 A1 | 12/2014 | He et al. |
| 2014/0364212 A1 | 12/2014 | Osman |
| 2015/0104069 A1 | 4/2015 | Li |
| 2015/0235426 A1 | 8/2015 | Lyons |
| 2015/0254882 A1 | 9/2015 | Englert |
| 2015/0381974 A1* | 12/2015 | Hoffman ............... G06T 19/006 345/419 |
| 2016/0163110 A1 | 6/2016 | Chang |
| 2016/0184703 A1 | 6/2016 | Brav |
| 2016/0214015 A1 | 7/2016 | Osman |
| 2016/0214016 A1 | 7/2016 | Stafford |
| 2016/0259169 A1 | 9/2016 | Smith |
| 2017/0061695 A1 | 3/2017 | Ishino |

OTHER PUBLICATIONS

PCT International Search Report and Written Opinion dated Jan. 12, 2016, issued in corresponding International Application No. PCT/US2015/00116 (7 pages).

International Application No. PCT/US2016/020730, International Preliminary Report on Patentability dated Sep. 5, 2017.

Non-Final Office Action for U.S. Appl. No. 15/060,429, dated Jun. 30, 2017, 11 pages.

Non-Final Office Action for U.S. Appl. No. 15/060,462, dated Jul. 28, 2017, 10 pages.

\* cited by examiner

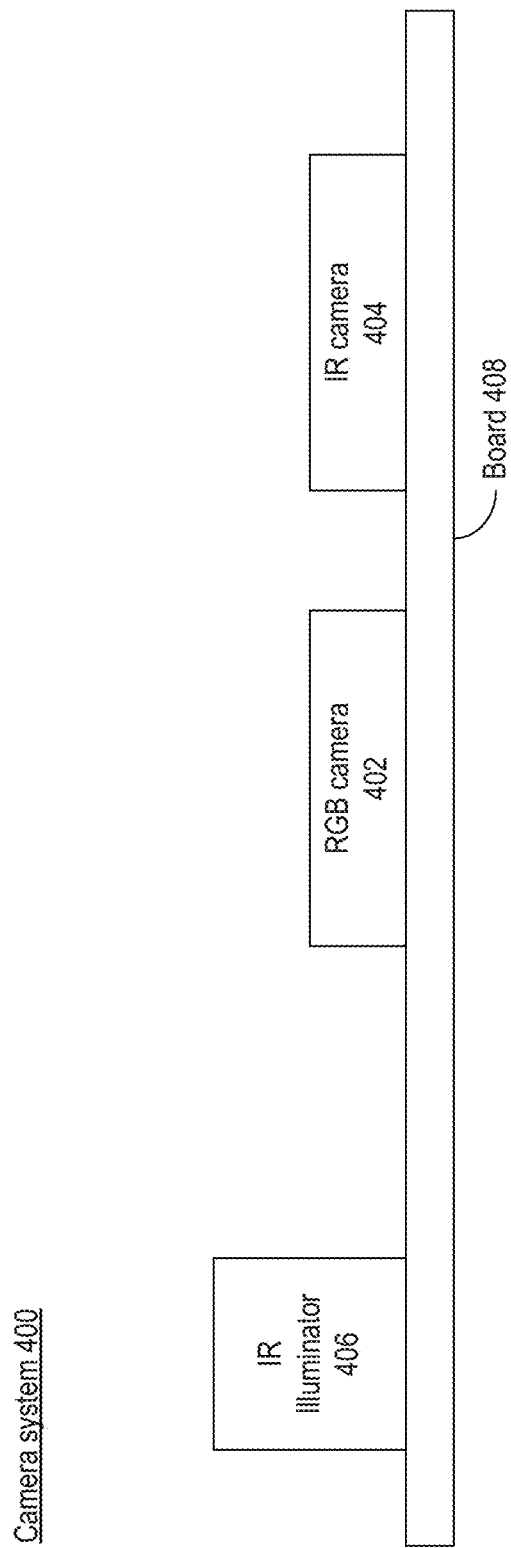

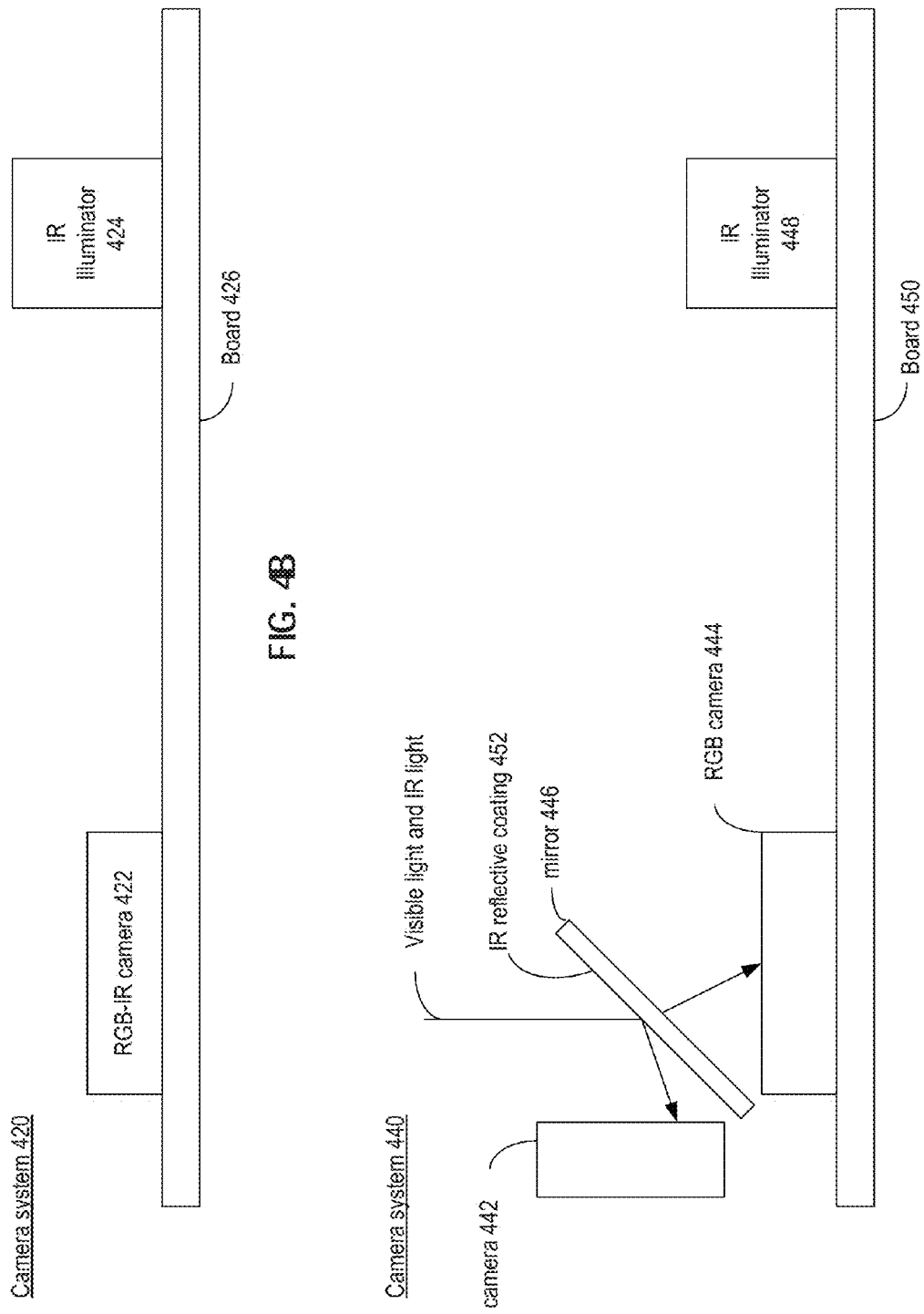

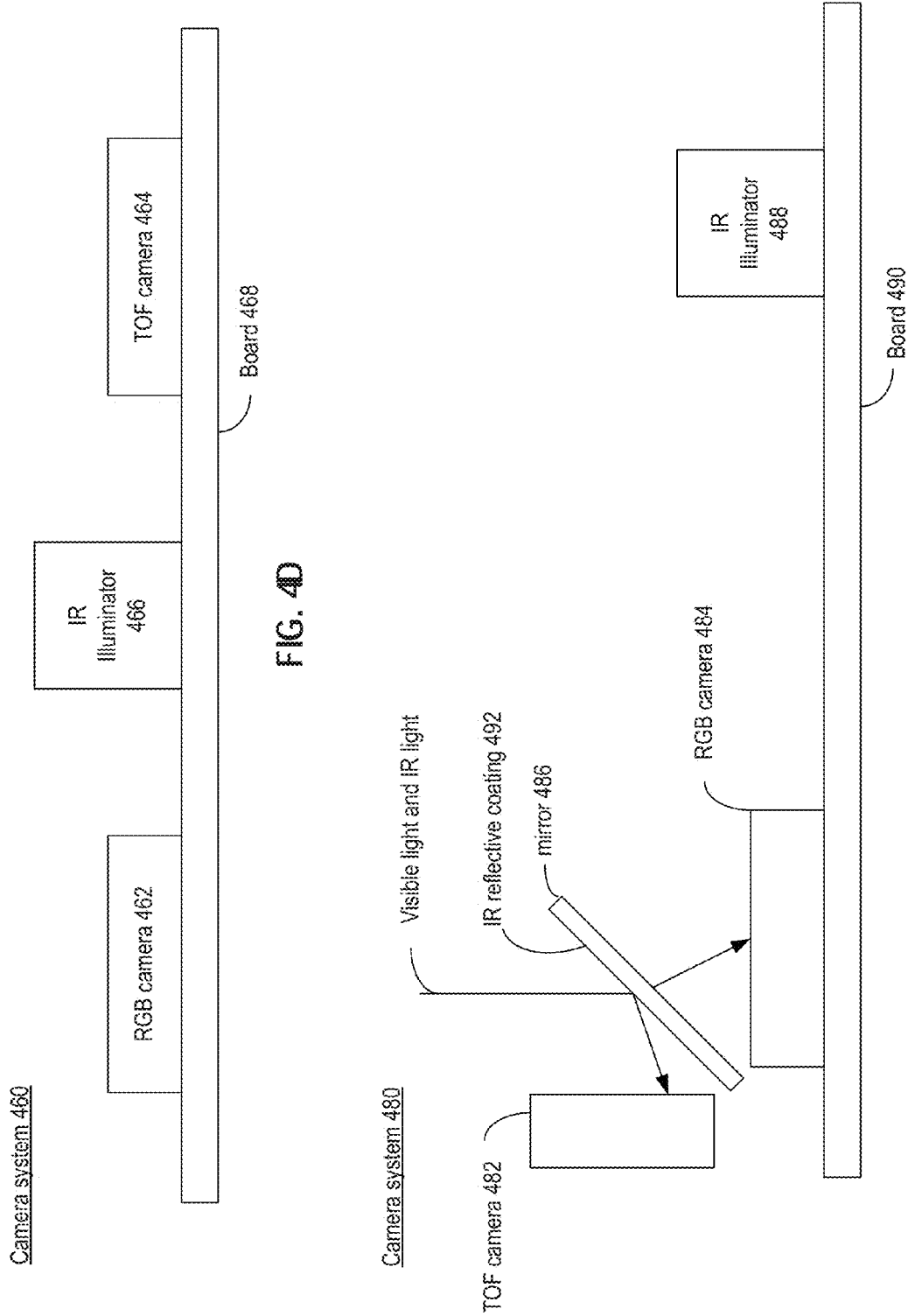

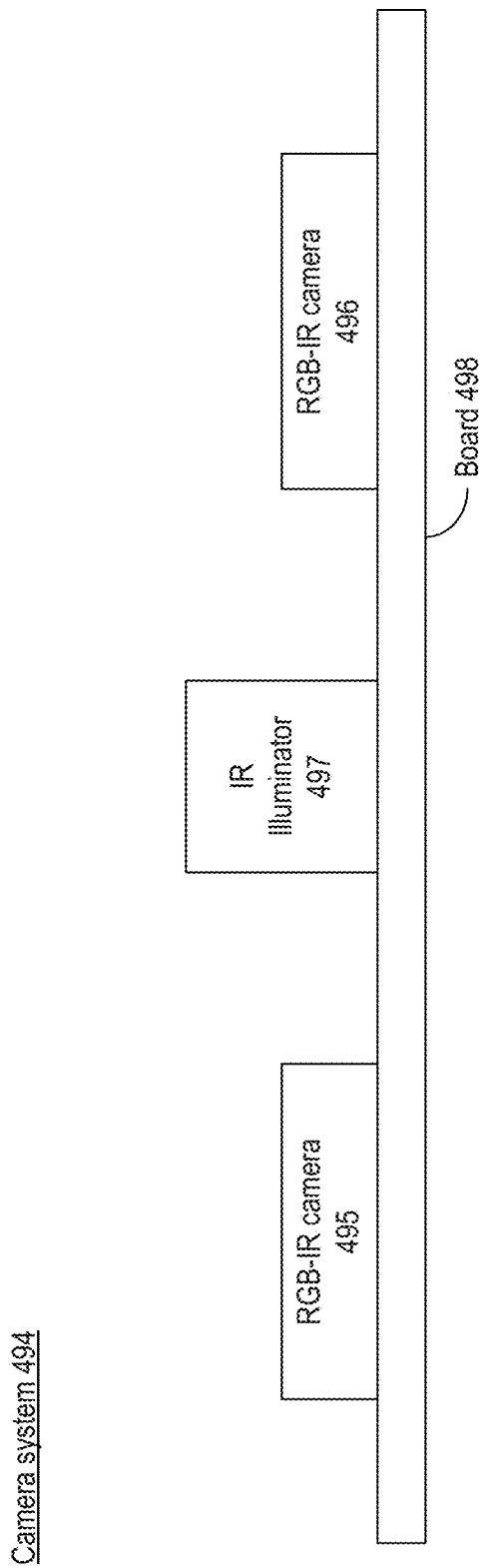

SYSTEM AND METHOD FOR IMMERSIVE AND INTERACTIVE MULTIMEDIA GENERATION

CROSS REFERENCE TO RELATED APPLICATIONS

This application claims the benefit of U.S. Provisional Application No. 62/068,423, filed Oct. 24, 2014, the content of which is hereby incorporated by reference in its entirety.

FIELD

The present disclosure relates to a technical field of human-computer interaction, and in particular to immersive and interactive multimedia generation.

BACKGROUND

Immersive multimedia typically includes providing multimedia data (in the form of audio and video) related to an environment that enables a person who receive the multimedia data to have the experience of being physically present in that environment. The generation of immersive multimedia is typically interactive, such that the multimedia data provided to the person can be automatically updated based on, for example, a physical location of the person, an activity performed by the person, etc. Interactive immersive multimedia can improve the user experience by, for example, making the experience more life-like.

There are two main types of interactive immersive multimedia. The first type is virtual reality (VR), in which the multimedia data replicates an environment that simulates physical presences in places in, for example, in the real world or imaged world. The rendering of the environment also reflects an action performed by the user, thereby enabling the user to interact with the environment. The action (e.g., a body movement) of the user can typically be detected by a motion sensor. Virtual reality artificially creates sensory experiences which can include sight, hearing, touch, etc.

The second type of interactive immersive multimedia is augmented reality (AR), in which the multimedia data includes real-time graphical images of the physical environment in which the person is located, as well as additional digital information. The additional digital information typically is laid on top of the real-time graphical images, but does not alter or enhance the rendering of the real-time graphical images of the physical environment. The additional digital information can also be images of an virtual object, however, typically the image of the virtual object is just laid on top of the real-time graphical images, instead of being blended into the physical environment to create a realistic rendering. The rendering of the physical environment can also reflect an action performed by the user and/or a location of the person to enable interaction. The action (e.g., a body movement) of the user can typically be detected by a motion sensor, while the location of the person can be determined by detecting and tracking features of the physical environment from the graphical images. Augmented reality can replicate some of the sensory experiences of a person while being present in the physical environment, while simultaneously providing the person additional digital information.

Currently there is no system that can provide a combination of virtual reality and augmented reality that creates a realistic blending of images of virtual objects and images of physical environment. Moreover, while current augmented reality systems can replicate a sensory experience of a user, such systems typically cannot enhance the sensing capability of the user.

SUMMARY OF THE DISCLOSURE

Additional aspects and advantages of embodiments of present disclosure will be given in part in the following descriptions, become apparent in part from the following descriptions, or be learned from the practice of the embodiments of the present disclosure.

According to some embodiments, an apparatus comprises an optical sensing system that comprises at least one camera, the at least one camera being configured to acquire an image of a physical environment. The apparatus further comprises a processing system. The processing system comprises an orientation and position determination module configured to detect salient features from the image, and determine a change in orientation and/or position of the apparatus with respect to the physical environment based on the detected salient features. The processing system also comprises a rendering module configured to determine a rendering of the physical environment based on the image and on the determined change in orientation and/or position of the apparatus, and provide data related to the rendering of the physical environment to a display system.

According to some embodiments, the optical sensing system comprises a first camera and a second camera, the first camera being configured to acquire a first image of the physical environment, and the second camera being configured to acquire a second image of the physical environment. The orientation and position determination module is configured to detect first salient features from the first and second images when the apparatus is at a first position in the physical environment, determine a first set of coordinates associated with the first salient features, detect second salient features from the first and second images when the apparatus is at a second position in the physical environment, determine a second set of coordinates associated with the second salient features, and responsive to a determination that the first and second salient features correspond to each other, determine a change in orientation and/or position of the apparatus with respect to the physical environment based on the first and second set of coordinates. The rendering module is also configured to determine a stereoscopic rendering of the physical environment based on the first and second images and on the determined change in orientation and/or position of the apparatus. According to some embodiments, each of the first and second cameras includes red-green-blue-infra-red (RGB-IR) pixel sensors.

According to some embodiments, the optical sensing system comprises a first camera, a second camera, and a mirror, the first camera being configured to acquire an infra-red (IR) image, the second camera being configured to acquire a red-green-blue (RGB) image, and the mirror being configured to reflect IR light away from the second camera and to align the IR image with the RGB image. In some embodiments, the first camera is a time-of-flight camera. In some embodiments, the first camera is an IR camera.

According to some embodiments, the optical sensing system comprises an IR illuminator configured to project one or more patterns into the physical environments; wherein the detected salient features include the one or more patterns.

According to some embodiments, the processing system further comprises a hand gesture determination module configured to detect a hand gesture from the image, and determine a user instruction associated with the hand gesture. The rendering module is configured to determine the rendering of the physical environment based on the determined user instruction. In some embodiments, the hand gesture determination module is configured to determine that the user instruction is associated with a selection of an object being rendered, and the rendering module is configured to determine a change in the rendering of the object based on the user instruction. In some embodiments, the object is a virtual object. In some embodiments, the object is a physical object present in the physical environment.

According to some embodiments, the rendering module is configured to blend an image of a virtual object with an image of a physical object located in the physical environment in the rendering of the physical environment; wherein the blending is based on a first set of coordinates associated with the virtual object and a second set of coordinates associated with the physical object. In some embodiments, the blending includes rendering of audio data associated with the virtual object and audio signal originated from the physical environment.

According to some embodiments, the apparatus further comprises a connector configured to connect to a smart phone. In some embodiments, the smart phone comprises at least part of the processing system. In some embodiments, the smart phone is configured to provide additional content, and the rendering module is configured to determine a rendering of the physical environment based on the image and the additional content.

BRIEF DESCRIPTION OF THE DRAWINGS

Reference will now be made to the accompanying drawings showing example embodiments of the present application, and in which:

FIG. 4A-F are schematic diagrams of exemplary camera systems for supporting immersive and interactive multimedia generation, consistent with embodiments of the present disclosure.

DETAILED DESCRIPTION

Reference will now be made in detail to the embodiments, the examples of which are illustrated in the accompanying drawings. Whenever possible, the same reference numbers will be used throughout the drawings to refer to the same or like parts.

The description of the embodiments is only exemplary, and is not intended to be limiting.

Figure 1:
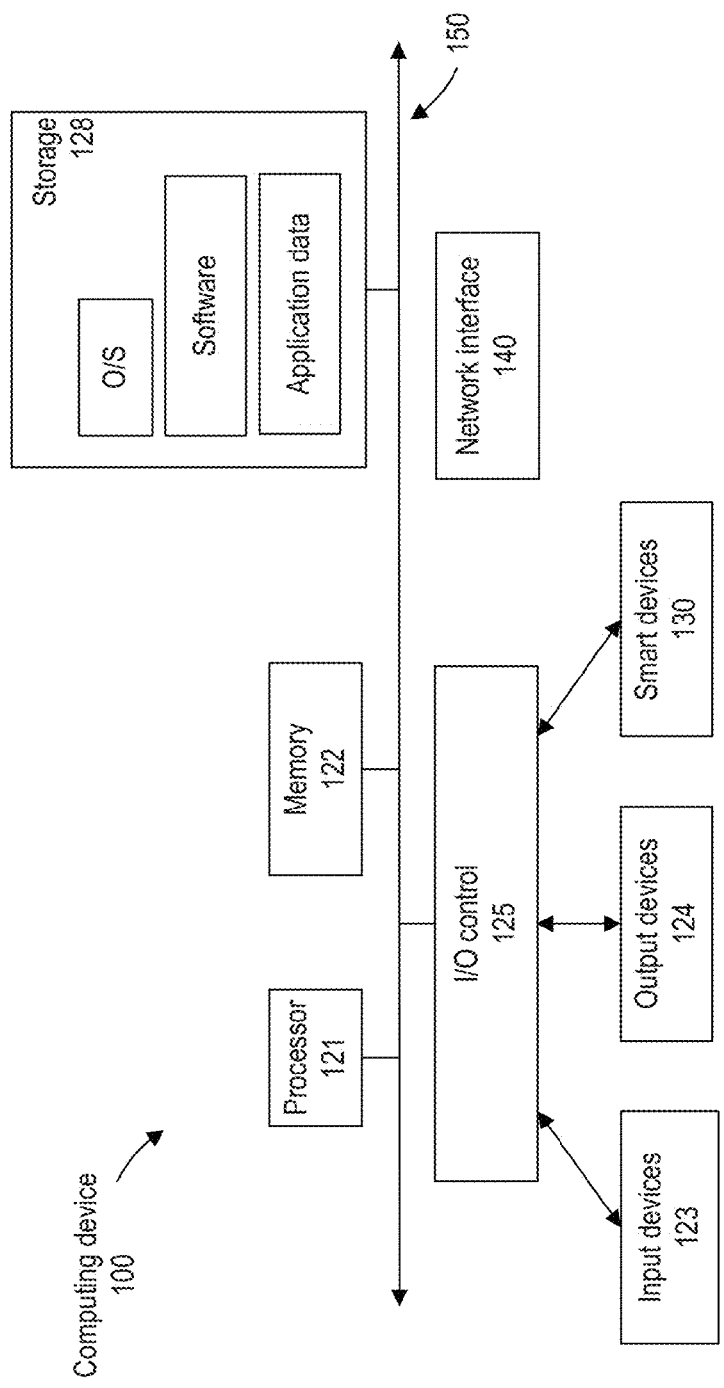
FIG. 1 is a block diagram of an exemplary computing device with which embodiments of the present disclosure can be implemented.

FIG. 1 is a block diagram of an exemplary computing device 100 with which embodiments of the present disclosure can be implemented. As shown in FIG. 1, computing device 100 includes a processor 121 and a main memory 122. Processor 121 can be any logic circuitry that responds to and processes instructions fetched from the main memory 122. Processor 221 can be a single or multiple general-purpose microprocessors, field-programmable gate arrays (FPGAs), or digital signal processors (DSPs) capable of executing instructions stored in a memory (e.g., main memory 122), or an Application Specific Integrated Circuit (ASIC), such that processor 221 is configured to perform a certain task.

Memory 122 includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 122 can be one or more memory chips capable of storing data and allowing any storage location to be directly accessed by processor 121. Main memory 122 can be any type of random access memory (RAM), or any other available memory chip capable of operating as described herein. In the exemplary embodiment shown in FIG. 1, processor 121 communicates with main memory 122 via a system bus 150.

Computing device 100 can further comprise a storage device 128, such as one or more hard disk drives, for storing an operating system and other related software, for storing application software programs, and for storing application data to be used by the application software programs. For example, the application data can include multimedia data, while the software can include a rendering engine configured to render the multimedia data. The software programs can include one or more instructions, which can be fetched to memory 122 from storage 128 to be processed by processor 121. The software programs can include different software modules, which can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules (e.g., in a case where processor 221 is an ASIC), can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, storage 128. Volatile media can include, for example, memory 122. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Computing device 100 can also include one or more input devices 123 and one or more output devices 124. Input device 123 can include, for example, cameras, microphones, motion sensors, etc., while output devices 124 can include, for example, display units and speakers. Both input devices 123 and output devices 124 are connected to system bus 150 through I/O controller 125, enabling processor 121 to communicate with input devices 123 and output devices 124. The communication among processor 121 and input devices 123 and output devices 124 can be performed by, for example, PROCESSOR 121 executing instructions fetched from memory 122.

In some embodiments, processor 121 can also communicate with one or more smart devices 130 via I/O control 125. Smart devices 130 can include a system that includes capabilities of processing and generating multimedia data (e.g., a smart phone). In some embodiments, processor 121 can receive data from input devices 123, fetch the data to smart devices 130 for processing, receive multimedia data (in the form of, for example, audio signal, video signal, etc.) from smart devices 130 as a result of the processing, and then provide the multimedia data to output devices 124. In some embodiments, smart devices 130 can act as a source of multimedia content and provide data related to the multimedia content to processor 121. Processor 121 can then add the multimedia content received from smart devices 130 to output data to be provided to output devices 124. The communication between processor 121 and smart devices 130 can be implemented by, for example, processor 121 executing instructions fetched from memory 122.

In some embodiments, computing device 100 can be configured to generate interactive and immersive multimedia, including virtual reality, augmented reality, or a combination of both. For example, storage 128 can store multimedia data for rendering of graphical images and audio effects for production of virtual reality experience, and processor 121 can be configured to provide at least part of the multimedia data through output devices 124 to produce the virtual reality experience. Processor 121 can also receive data received from input devices 123 (e.g., motion sensors) that enable processor 121 to determine, for example, a change in the location of the user, an action performed by the user (e.g., a body movement), etc. Processor 121 can be configured to, based on the determination, render the multimedia data through output devices 124, to create an interactive experience for the user.

Moreover, computing device 100 can also be configured to provide augmented reality. For example, input devices 123 can include one or more cameras configured to capture graphical images of a physical environment a user is located in, and one or more microphones configured to capture audio signals from the physical environment. Processor 121 can receive data representing the captured graphical images and the audio information from the cameras. Processor 121 can also process data representing additional content to be provided to the user. The additional content can be, for example, information related one or more objects detected from the graphical images of the physical environment. Processor 121 can be configured to render multimedia data that include the captured graphical images, the audio information, as well as the additional content, through output devices 124, to produce an augmented reality experience. The data representing additional content can be stored in storage 128, or can be provided by an external source (e.g., smart devices 130).

Processor 121 can also be configured to create an interactive experience for the user by, for example, acquiring information about a user action, and the rendering of the multimedia data through output devices 124 can be made based on the user action. In some embodiments, the user action can include a change of location of the user, which can be determined by processor 121 based on, for example, data from motion sensors, and tracking of salient features from the graphical images. In some embodiments, the user action can also include a hand gesture, which can be determined by processor 121 based on images of the hand gesture captured by the cameras. Processor 121 can be configured to, based on the location information and/or hand gesture information, update the rendering of the multimedia data to create the interactive experience. In some embodiments, processor 121 can also be configured to update the rendering of the multimedia data to enhance the sensing capability of the user by, for example, zooming into a specific location in the physical environment, increasing the volume of audio signal originated from that specific location, etc., based on the hand gesture of the user.

Figure 2B:
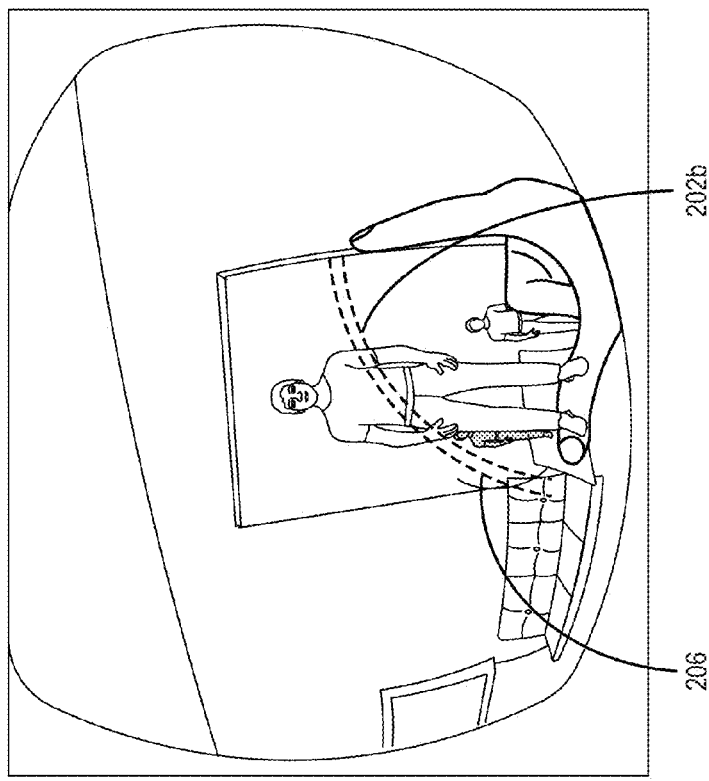
FIGS. 2A-2B are illustrations of exemplary renderings illustrating immersive multimedia generation, consistent with embodiments of the present disclosure.
Figure 2A:
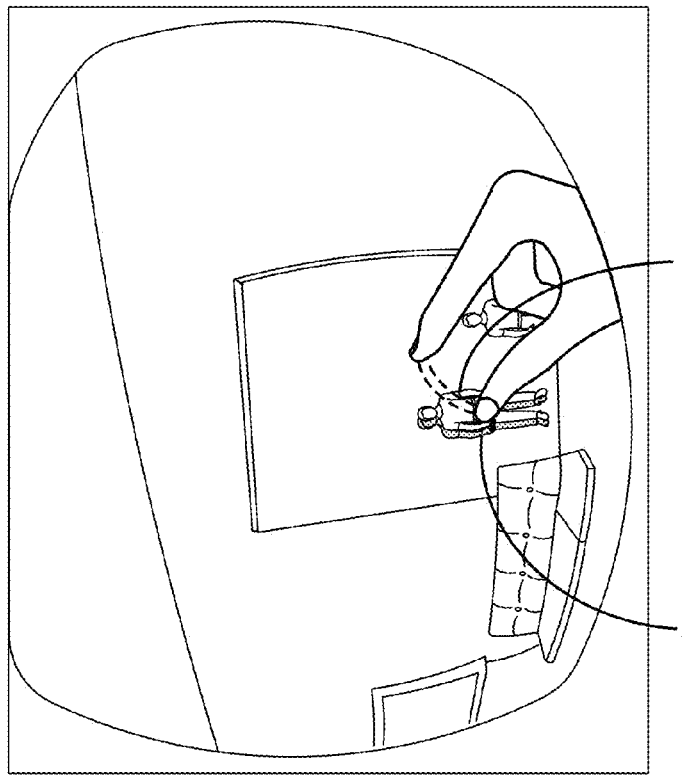

Reference is now made to FIGS. 2A and 2B, which illustrates exemplary multimedia renderings 200a and 200b for providing augmented reality consistent with embodiments of the present disclosure. As shown in FIGS. 2A and 2B, rendering 200a and 200b reflect a graphical representation of a physical environment a user is located in. In some embodiments, renderings 200a and 200b can be constructed by processor 221 of computing device 100 based on graphical images captured by one or more cameras (e.g., input devices 123). Processor 221 can also be configured to detect a hand gesture from the graphical images, and update the rendering to include additional content related to the hand gesture. As an illustrative example, as shown in FIGS. 2A and 2B, renderings 200*a* and 200*b* can include, respectively, dotted lines 204*a* and 204*b* that represent a movement of the fingers involved in the creation of the hand gesture. In some embodiments, the detected hand gesture can trigger additional processing of the graphical images to enhance sensing capabilities (e.g., sight) of the user. As an illustrative example, as shown in FIG. 2A, the physical environment rendered in rendering 200*a* includes an object 204. Object 204 can be selected based on a detection of a first hand gesture, and an overlapping between the movement of the fingers that create the first hand gesture (e.g., as indicated by dotted lines 202*a*). The overlapping can be determined based on, for example, a relationship between the 3D coordinates of the dotted lines 202*a* and the 3D coordinates of object 204 in a 3D map that represents the physical environment.

After object 204 is selected, the user can provide a second hand gesture (as indicated by dotted lines 202*b*), which can also be detected by processor 221. Processor 221 can, based on the detection of the two hand gestures that occur in close temporal and spatial proximity, determine that the second hand gesture is to instruct processor 221 to provide an enlarged and magnified image of object 204 in the rendering of the physical environment. This can lead to rendering 200*b*, in which image 206, which represents an enlarged and magnified image of object 204, is rendered, together with the physical environment the user is located in. By providing the user a magnified image of an object, thereby allowing the user to perceive more details about the object than he or she would have perceived with naked eyes at the same location within the physical environment, the user's sensory capability can be enhanced.

In some embodiments, object 204 can also be a virtual object inserted in the rendering of the physical environment, and image 206 can be any image (or just text overlaying on top of the rendering of the physical environment) provided in response to the selection of object 204 and the detection of hand gesture represented by dotted lines 202*b*.

Referring back to FIG. 1, in some embodiments computing device 100 can also include a network interface 140 to interface to a LAN, WAN, MAN, or the Internet through a variety of link including, but not limited to, standard telephone lines, LAN or WAN links (e.g., 802.11, T1, T3, 56 kb, X.25), broadband link (e.g., ISDN, Frame Relay, ATM), wireless connections (Wi-Fi, Bluetooth, Z-Wave, Zigbee), or some combination of any or all of the above. Network interface 140 can comprise a built-in network adapter, network interface card, PCMCIA network card, card bus network adapter, wireless network adapter, USB network adapter, modem or any other device suitable for interfacing computing device 100 to any type of network capable of communication and performing the operations described herein. In some embodiments, processor 121 can transmit the generated multimedia data not only to output devices 124 but also to other devices (e.g., another computing device 100) via network interface 140.

Figure 3:
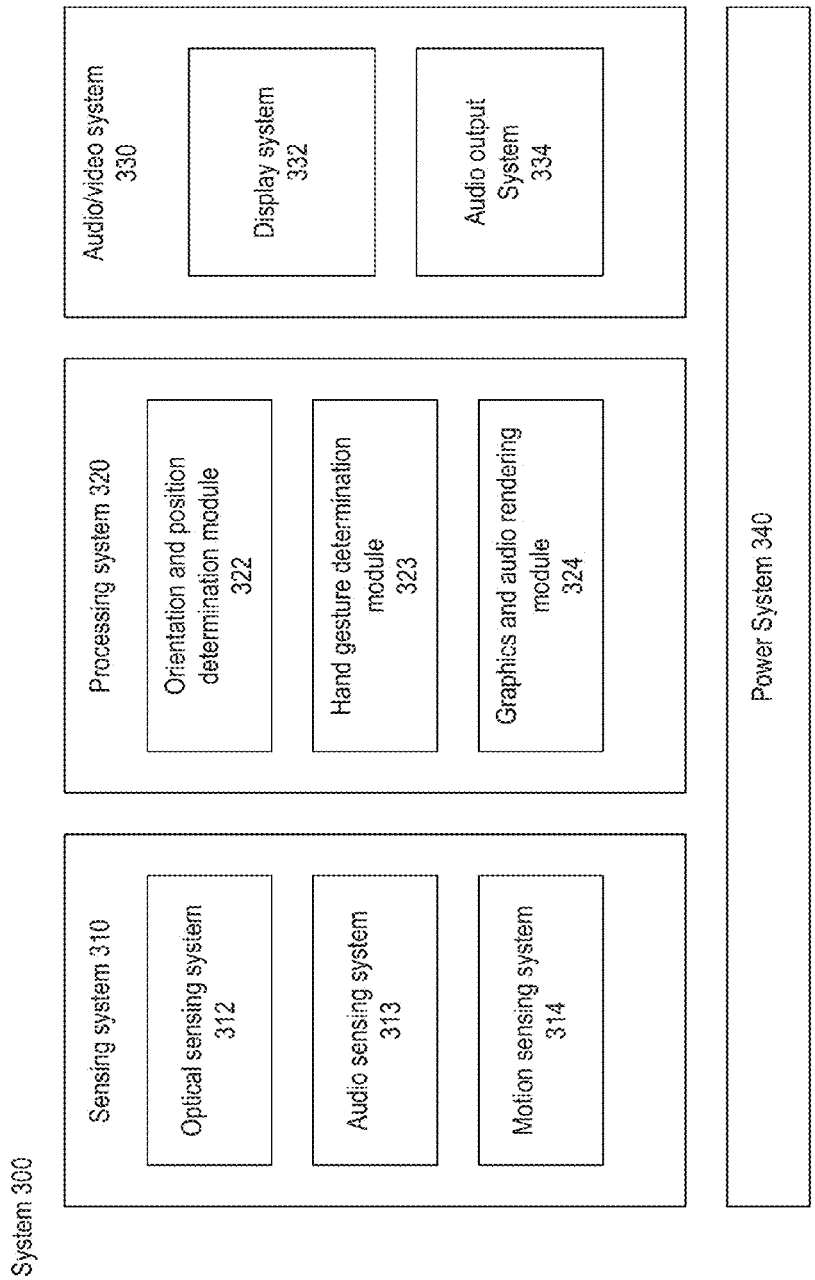
FIG. 3 is a block diagram of an exemplary system for immersive and interactive multimedia generation, consistent with embodiments of the present disclosure.

FIG. 3 is a block diagram of an exemplary system 300 for immersive and interactive multimedia generation, consistent with embodiments of the present disclosure. As shown in FIG. 3, system 300 includes a sensing system 310, processing system 320, an audio/video system 330, and a power system 340. In some embodiments, at least part of system 300 is implemented with computing device 100 of FIG. 1.

In some embodiments, sensing system 310 is configured to provide data for generation of interactive and immersive multimedia. Sensing system 310 includes an image sensing system 312, an audio sensing system 313, and a motion sensing system 314.

In some embodiments, optical sensing system 312 can be configured to receive lights of various wavelengths (including both visible and invisible lights) reflected or emitted from a physical environment. In some embodiments, optical sensing system 312 includes, for example, one or more grayscale-infra-red (grayscale IR) cameras, one or more red-green-blue (RGB) cameras, one or more RGB-IR cameras, one or more time-of-flight (TOF) cameras, or a combination of them. Based on the output of the cameras, system 300 can acquire image data of the physical environment (e.g., represented in the form of RGB pixels and IR pixels). Optical sensing system 312 can include a pair of identical cameras (e.g., a pair of RGB cameras, a pair of IR cameras, a pair of RGB-IR cameras, etc.), which each camera capturing a viewpoint of a left eye or a right eye. As to be discussed below, the image data captured by each camera can then be combined by system 300 to create a stereoscopic 3D rendering of the physical environment.

In some embodiments, optical sensing system 312 can include an IR projector configured to illuminate the object. The illumination can be used to support range imaging, which enables system 300 to determine, based also on stereo matching algorithms, a distance between the camera and different parts of an object in the physical environment. Based on the distance information, a three-dimensional (3D) depth map of the object, as well as a 3D map of the physical environment, can be created. As to be discussed below, the depth map of an object can be used to create 3D point clouds that represent the object; the RGB data of an object, as captured by the RGB camera, can then be mapped to the 3D point cloud to create a 3D rendering of the object for producing the virtual reality and augmented reality effects. On the other hand, the 3D map of the physical environment can be used for location and orientation determination to create the interactive experience. In some embodiments, a time-of-flight camera can also be included for range imaging, which allows the distance between the camera and various parts of the object to be determined, and depth map of the physical environment can be created based on the distance information.

In some embodiments, the IR projector is also configured to project certain patterns (e.g., bar codes, corner patterns, etc.) onto one or more surfaces of the physical environment. As to be discussed below, a motion of the user (as reflected by the motion of the camera) can be determined by tracking various salient feature points captured by the camera, and the projection of known patterns (which are then captured by the camera and tracked by the system) enables efficient and robust tracking.

Reference is now made to FIGS. 4A-F, which are schematic diagrams illustrating, respectively, exemplary camera systems 400, 420, 440, 460, 480, and 494 consistent with embodiments of the present disclosure. Each camera system of FIGS. 4A-F can be part of optical sensing system 312 of FIG. 3.

As shown in FIG. 4A, camera system 400 includes RGB camera 402, IR camera 404, and an IR illuminator 406, all of which are attached onto a board 408. As discussed above, RGB camera 402 is configured to capture RGB image data, IR camera 404 is configured to capture IR image data, while a combination of IR camera 404 and IR illuminator 406 can be used to create a depth map of an object being imaged. As discussed before, during the 3D rendering of the object, the RGB image data can be mapped to a 3D point cloud representation of the object created from the depth map. However, in some cases, due to a positional difference between the RGB camera and the IR camera, not all of the RGB pixels in the RGB image data can be mapped to the 3D point cloud. As a result, inaccuracy and discrepancy can be introduced in the 3D rendering of the object.

FIG. 4B illustrates a camera system 420, which includes an RGB-IR camera 422 and an IR illuminator 424, all of which are attached onto a board 426. RGB-IR camera 442 includes a RGB-IR sensor which includes RGB and IR pixel sensors mingled together to form pixel groups. With RGB and IR pixel sensors substantially co-located, the aforementioned effects of positional difference between the RGB and IR sensors can be eliminated. However, in some cases, due to overlap of part of the RGB spectrum and part of the IR spectrum, having RGB and IR pixel sensors co-located can lead to degradation of color production of the RGB pixel sensors as well as color image quality produced by the RGB pixel sensors.

FIG. 4C illustrates a camera system 440, which includes an IR camera 442, a RGB camera 444, a mirror 446, and an IR illuminator 448, all of which are attached to board 450. In some embodiments, mirror 446 is semi-transparent with an IR reflective coating 452. As light (including visual light, and IR light reflected by an object illuminated by IR illuminator 448) is incident on mirror 446, the IR light can be reflected by mirror 446 and captured by IR camera 442, while the visual light can pass through mirror 446 and be captured by RGB camera 444. IR camera 442, RGB camera 444, and mirror 446 can be positioned such that the IR image captured by IR camera 442 (caused by the reflection by the IR reflective coating) and the RGB image captured by RGB camera 444 (from the visible light that passes through mirror 446) can be aligned to eliminate the effect of position difference between IR camera 442 and RGB camera 444. Moreover, since the IR light is reflected away from RGB camera 444, the color product as well as color image quality produced by RGB camera 444 can be improved.

FIG. 4D illustrates a camera system 460 that includes RGB camera 462, TOF camera 464, and an IR illuminator 466, all of which are attached onto a board 468. Similar to camera systems 400, 420, and 440, RGB camera 462 is configured to capture RGB image data. On the other hand, TOF camera 464 and IR illuminator 406 are synchronized to perform image-ranging, which can be used to create a depth map of an object being imaged, from which a 3D point cloud of the object can be created. Similar to camera system 400, in some cases, due to a positional difference between the RGB camera and the TOF camera, not all of the RGB pixels in the RGB image data can be mapped to the 3D point cloud created based on the output of the TOF camera. As a result, inaccuracy and discrepancy can be introduced in the 3D rendering of the object.

FIG. 4E illustrates a camera system 480, which includes a TOF camera 482, a RGB camera 484, a mirror 486, and an IR illuminator 488, all of which are attached to board 490. In some embodiments, mirror 486 is semi-transparent with an IR reflective coating 492. As light (including visual light, and IR light reflected by an object illuminated by IR illuminator 488) is incident on mirror 446, the IR light can be reflected by mirror 446 and captured by TOF camera 482, while the visual light can pass through mirror 486 and be captured by RGB camera 484. TOF camera 482, RGB camera 484, and mirror 486 can be positioned such that the IR image captured by TOF camera 442 (caused by the reflection by the IR reflective coating) and the RGB image captured by RGB camera 484 (from the visible light that passes through mirror 486) can be aligned to eliminate the effect of position difference between TOF camera 482 and RGB camera 484. Moreover, since the IR light is reflected away from RGB camera 484, the color product as well as color image quality produced by RGB camera 484 can also be improved.

FIG. 4F illustrates a camera system 494, which includes two RGB-IR cameras 495 and 496, with each configured to mimic the view point of a human eye. A combination of RGB-IR cameras 495 and 496 can be used to generate stereoscopic images and to generate depth information of an object in the physical environment, as to be discussed below. Since each of the cameras have RGB and IR pixels co-located, the effect of positional difference between the RGB camera and the IR camera that leads to degradation in pixel mapping can be mitigated. Camera system 494 further includes an IR illuminator 497 with similar functionalities as other IR illuminators discussed above. As shown in FIG. 4F, RGB-IR cameras 495 and 496 and IR illuminator 497 are attached to board 498.

Referring back to FIG. 3, sensing system 310 also includes audio sensing system 313 and motion sensing system 314. Audio sensing system 313 can be configured to receive audio signals originated from the physical environment. In some embodiments, audio sensing system 313 includes, for example, one or more microphone arrays. Motion sensing system 314 can be configured to detect a motion and/or a pose of the user (and of the system, if the system is attached to the user). In some embodiments, motion sensing system 314 can include, for example, inertial motion sensor (IMU). In some embodiments, sensing system 310 can be part of input devices 123 of FIG. 1.

In some embodiments, processing system 320 is configured to process the graphical image data from optical sensing system 312, the audio data from audio sensing system 313, and motion data from motion sensing system 314, and to generate multimedia data for rendering the physical environment to create the virtual reality and/or augmented reality experiences. Processing system 320 includes an orientation and position determination module 322, a hand gesture determination system module 323, and a graphics and audio rendering engine module 324. As discussed before, each of these modules can be software modules being executed by a processor (e.g., processor 121 of FIG. 1), or hardware modules (e.g., ASIC) configured to perform specific functions.

In some embodiments, orientation and position determination module 322 can determine an orientation and a position of the user based on at least some of the outputs of sensing system 310, based on which the multimedia data can be rendered to produce the virtual reality and/or augmented reality effects. In a case where system 300 is worn by the user (e.g., a goggle), orientation and position determination module 322 can determine an orientation and a position of part of the system (e.g., the camera), which can be used to infer the orientation and position of the user. The orientation and position determined can be relative to prior orientation and position of the user before a movement occurs.

Figure 5:
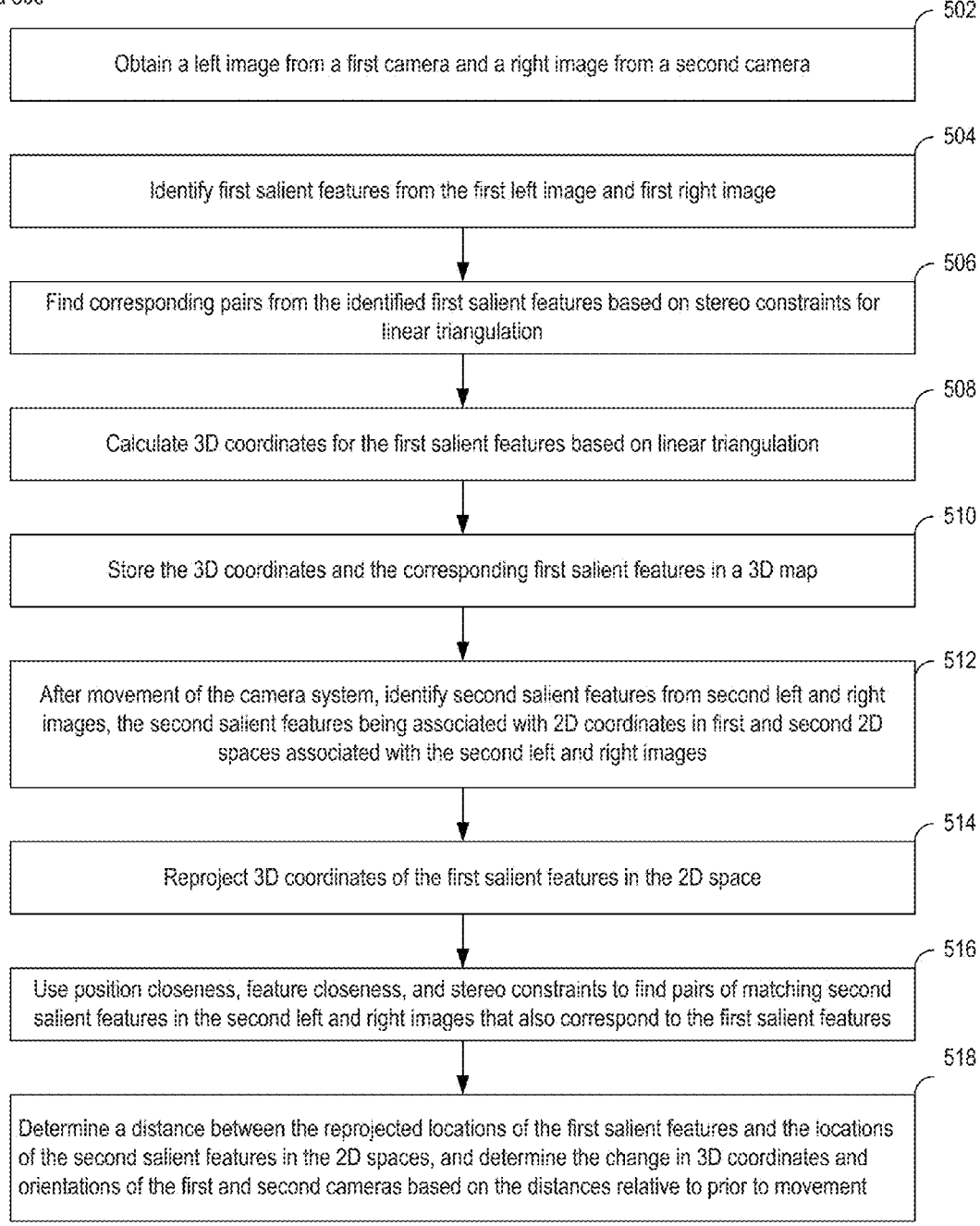
FIG. 5 is a flowchart of an exemplary method for sensing the location and pose of a camera to support immersive and interactive multimedia generation, consistent with embodiments of the present disclosure.

Reference is now made to FIG. 5, which is a flowchart that illustrates an exemplary method 500 for determining an orientation and a position of a pair cameras (e.g., of sensing system 310) consistent with embodiments of the present disclosure. It will be readily appreciated that the illustrated procedure can be altered to delete steps or further include additional steps. While method 500 is described as being performed by a processor (e.g., orientation and position determination module 322), it is appreciated that method 500 can be performed by other devices alone or in combination with the processor.

In step 502, the processor can obtain a first left image from a first camera and a first right image from a second camera. The left camera can be, for example, RGB-IR camera 495 of FIG. 4F, while the right camera can be, for example, RGB-IR camera 496 of FIG. 4F. The first left image can represent a viewpoint of a physical environment from the left eye of the user, while the first right image can represent a viewpoint of the physical environment from the right eye of the user. Both images can be IR image, RGB image, or a combination of both (e.g., RGB-IR).

In step 504, the processor can identify a set of first salient feature points from the first left image data and from the right image data. In some cases, the salient features can be physical features that are pre-existing in the physical environment (e.g., specific markings on a wall, features of clothing, etc.), and the salient features are identified based on RGB pixels and/or IR pixels associated with these features. In some cases, the salient features can be created by an IR illuminator (e.g., IR illuminator 497 of FIG. 4F) that projects specific IR patterns (e.g., dots) onto one or more surfaces of the physical environment. The one or more surfaces can reflect the IR back to the cameras. As discussed before, those IR patterns can be designed for efficient detection and tracking, such as being evenly distributed and include sharp edges and corners. In some cases, the salient features can be created by placing one or more IR projectors that are fixed at certain locations within the physical environment and that project the IR patterns within the environment.

In step 506, the processor can find corresponding pairs from the identified first salient features based on stereo constraints for triangulation. The stereo constraints can include, for example, limiting a search range within each image for the corresponding pairs of first salient features based on stereo properties, a tolerance limit for disparity, etc. The identification of the corresponding pairs can be made based on the IR pixels of candidate features, the RGB pixels of candidate features, and/or a combination of both. After a corresponding pair of first salient features is identified, their location differences within the left and right images can be determined. Based on the location differences and the distance between the first and second cameras, a distance between the first salient features (as they appear in the physical environment) and the first and second cameras can be determined via linear triangulation.

In step 508, based on the distance between the first salient features and the first and second cameras determined by linear triangulation, and the location of the first salient features in the left and right images, the processor can determine one or more 3D coordinates of the first salient features.

In step 510, the processor can add or update, in a 3D map representing the physical environment, 3D coordinates of the first salient features determined in step 508 and information about the first salient features. The updating can be performed based on, for example, a simultaneous location and mapping algorithm (SLAM). The information stored can include, for example, IR pixels and RGB pixels information associated with the first salient features.

In step 512, after a movement of the cameras (e.g., caused by a movement of the user who carries the cameras), the processor can obtain a second left image and a second right image, and identify second salient features from the second left and right images after the movement. The identification process can be similar to step 504. The second salient features being identified are associated with 2D coordinates within a first 2D space associated with the second left image and within a second 2D space associated with the second right image.

In step 514, the processor can reproject the 3D coordinates of the first salient features (determined in step 508) into the first and second 2D spaces.

In step 516, the processor can identify one or more of the second salient features that correspond to the first salient features based on, for example, position closeness, feature closeness, and stereo constraints.

In step 518, the processor can determine a distance between the reprojected locations of the first salient features and the 2D coordinates of the second salient features in each of the first and second 2D spaces. The relative 3D coordinates and orientations of the first and second cameras before and after the movement can then be determined based on the distances such that, for example, the set of 3D coordinates and orientations thus determined minimize the distances in both of the first and second 2D spaces.

In some embodiments, method 500 further comprises a step (not shown in FIG. 5) in which the processor can perform bundle adjustment of the coordinates of the salient features in the 3D map to minimize the location differences of the salient features between the left and right images. The adjustment can be performed concurrently with any of the steps of method 500, and can be performed only on keyframes.

In some embodiments, the processor can also use data from our input devices to facilitate the performance of method 500. For example, the processor can obtain data from one or more motion sensors (e.g., motion sensing system 314), from which processor can determine that a motion of the cameras has occurred. Based on this determination, the processor can execute step 512. In some embodiments, the processor can also use data from the motion sensors to facilitate calculation of a location and an orientation of the cameras in step 518.

Referring back to FIG. 3, processing system 320 further includes a hand gesture determination module 323. In some embodiments, hand gesture determination module 323 can detect hand gestures from the graphical image data from optical sensing system 312. The techniques of hand gesture information are related to those described in U.S. application Ser. No. 14/034,286, filed Sep. 23, 2013, and U.S. application Ser. No. 14/462,324, filed Aug. 18, 2014. The above-referenced applications are incorporated herein by reference. The hand gesture information thus determined can be used to update the rendering (both graphical and audio) of the physical environment to provide additional content and/or to enhance sensory capability of the user, as discussed before in FIGS. 2A-B. For example, in some embodiments, hand gesture determination module 323 can determine an interpretation associated with the hand gesture (e.g., to select an object for zooming in), and then provide the interpretation and other related information to downstream logic (e.g., graphics and audio rendering module 324) to update the rendering.

Figure 6:
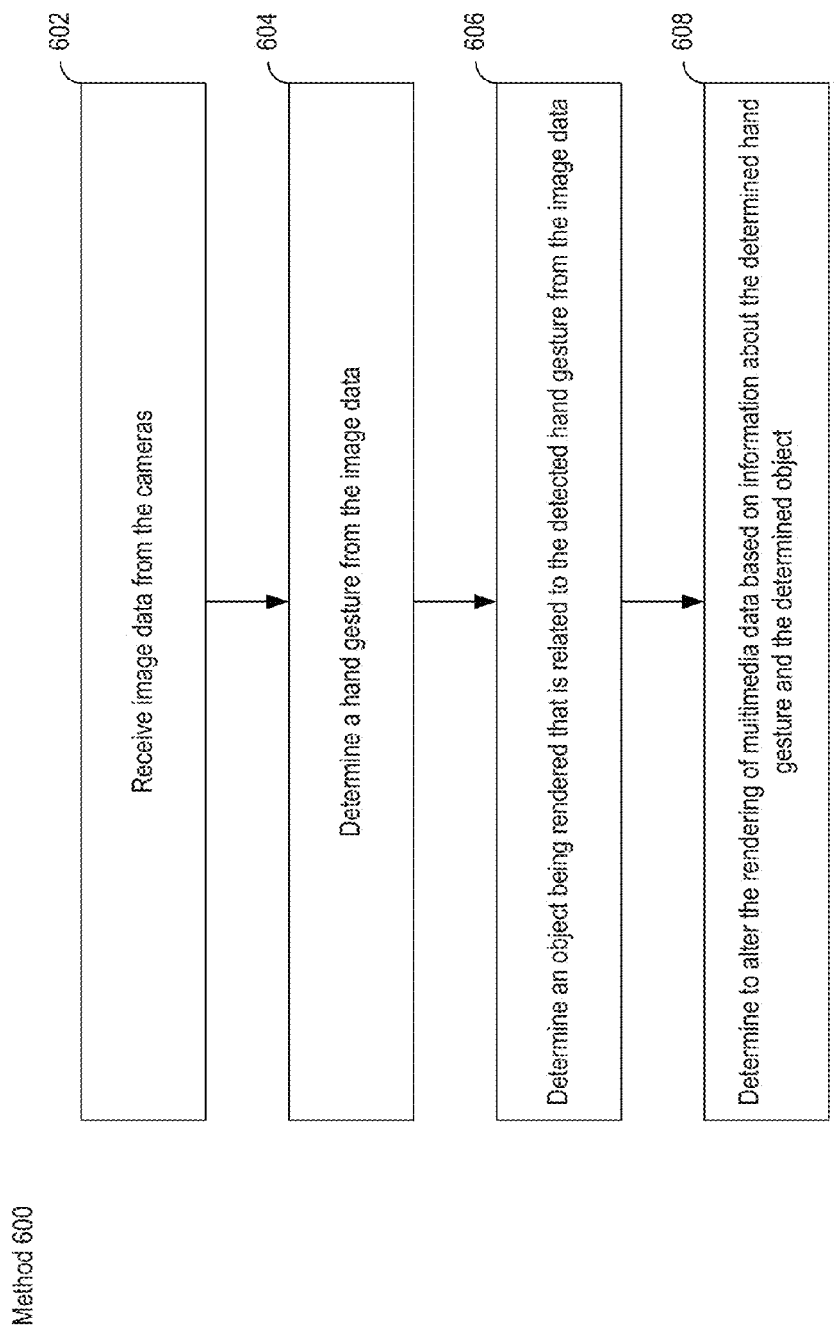
FIG. 6 is a flowchart of an exemplary method for updating multimedia rendering based on hand gesture consistent with embodiments of the present disclosure.

Reference is now made to FIG. 6, which is a flowchart that illustrates an exemplary method 600 for updating multimedia rendering based on detected hand gesture consistent with embodiments of the present disclosure. It will be readily appreciated that the illustrated procedure can be altered to delete steps or further include additional steps. While method 600 is described as being performed by a processor (e.g., hand gesture determination module 323), it is appreciated that method 600 can be performed by other devices alone or in combination with the processor.

In step 602, the processor can receive image data from one or more cameras (e.g., of optical sensing system 312). In a case where the cameras are gray-scale IR cameras, the processor can obtain the IR camera images. In a case where the cameras are RGB-IR cameras, the processor can obtain the IR pixel data.

In step 604, the processor can determine a hand gesture from the image data based on the techniques discussed above. The determination also includes determination of both a type of hand gesture (which can indicate a specific command) and the 3D coordinates of the trajectory of the fingers (in creating the hand gesture).

In step 606, the processor can determine an object, being rendered as part of the immersive multimedia data, that is related to the detected hand gesture. For example, in a case where the hand gesture signals a selection, the rendered object that is being selected by the hand gesture is determined. The determination can be based on a relationship between the 3D coordinates of the trajectory of hand gesture and the 3D coordinates of the object in a 3D map which indicates that certain part of the hand gesture overlaps with at least part of the object within the user's perspective.

In step 608, the processor can determine, based on information about the hand gesture determined in step 604 and the object determined in step 608, determine to alter the rendering of multimedia data. As an illustrative example, based on a determination that the hand gesture detected in step 604 is associated with a command to select an object (whether it is a real object located in the physical environment, or a virtual object inserted in the rendering) for a zooming action, the processor can provide a magnified image of the object to downstream logic (e.g., graphics and audio rendering module 324) for rendering. As another illustrative example, if the hand gesture is associated with a command to display additional information about the object, the processor can provide the additional information to graphics and audio rendering module 324 for rendering.

Referring back to FIG. 3, based on information about an orientation and a position of the camera (provided by, for example, orientation and position determination module 322) and information about a detected hand gesture (provided by, for example, hand gesture determination module 323), graphics and audio rendering module 324 can render immersive multimedia data (both graphics and audio) to create the interactive virtual reality and/or augmented reality experiences. Various methods can be used for the rendering. In some embodiments, graphics and audio rendering module 324 can create a first 3D mesh (can be either planar or curved) associated with a first camera that captures images for the left eye, and a second 3D mesh (also can be either planar or curved) associated with a second camera that captures images for the right eye. The 3D meshes can be placed at a certain imaginary distance from the camera, and the sizes of the 3D meshes can be determined such that they fit into a size of the camera's viewing frustum at that imaginary distance. Graphics and audio rendering module 324 can then map the left image (obtained by the first camera) to the first 3D mesh, and map the right image (obtained by the second camera) to the second 3D mesh. Graphics and audio rendering module 324 can be configured to only show the first 3D mesh (and the content mapped to it) when rendering a scene for the left eye, and to only show the second 3D mesh (and the content mapped to it) when rendering a scene for the right eye.

In some embodiments, graphics and audio rendering module 324 can also perform the rendering using a 3D point cloud. As discussed before, during the determination of location and orientation, depth maps of salient features (and the associated object) within a physical environment can be determined based on IR pixel data. 3D point clouds of the physical environment can then be generated based on the depth maps. Graphics and audio rendering module 324 can map the RGB pixel data of the physical environment (obtained by, e.g., RGB cameras, or RGB pixels of RGB-IR sensors) to the 3D point clouds to create a 3D rendering of the environment.

Figure 7:
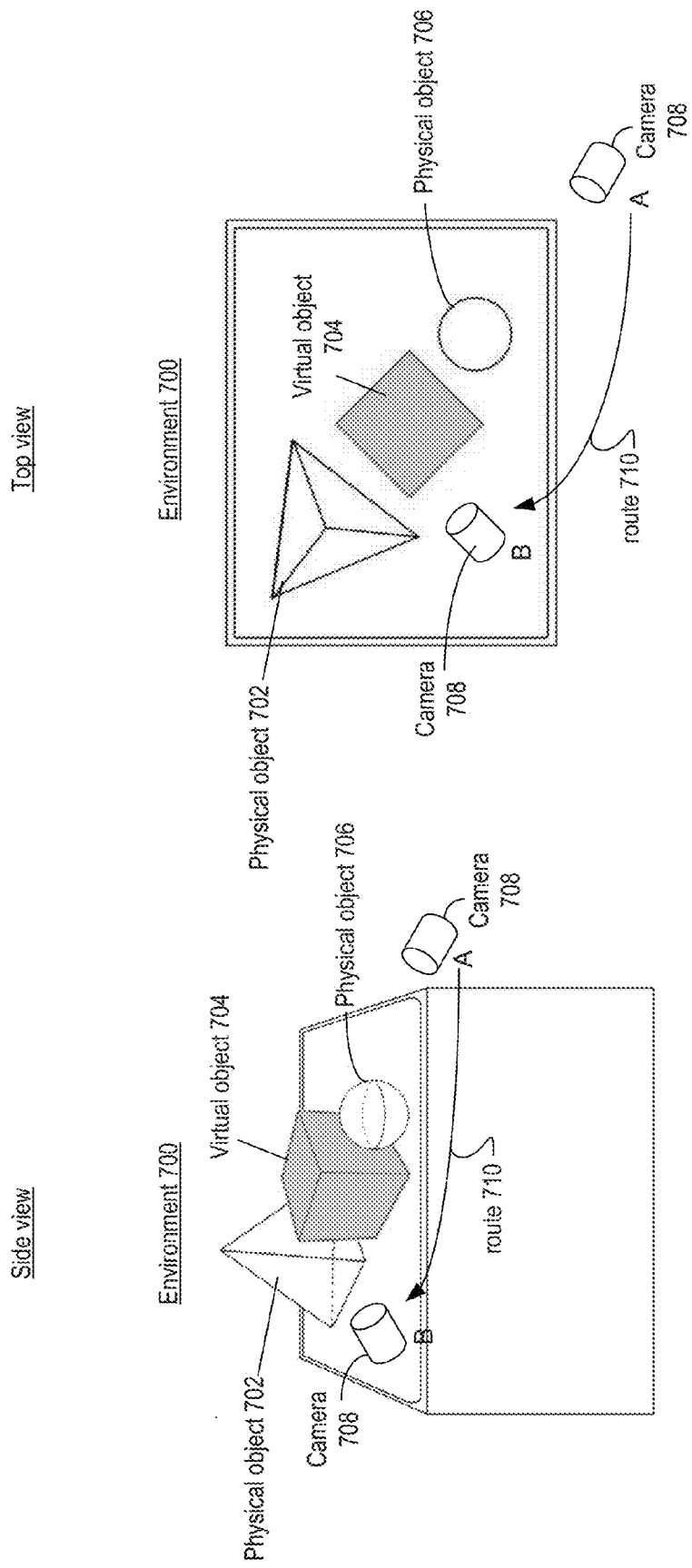
FIGS. 7A-B are illustrations of blending of an image of 3D virtual object into real-time graphical images of a physical environment consistent with embodiments of the present disclosure.

In some embodiments, in a case where images of a 3D virtual object is to be blended with real-time graphical images of a physical environment, graphics and audio rendering module 324 can be configured to determine the rendering based on the depth information of the virtual 3D object and the physical environment, as well as a location and an orientation of the camera. Reference is now made to FIGS. 7A and 7B, which illustrate the blending of an image of 3D virtual object into real-time graphical images of a physical environment, consistent with embodiments of the present disclosure. As shown in FIG. 7A, environment 700 includes a physical object 702 and a physical object 706. Graphics and audio rendering module 324 is configured to insert virtual object 704 between physical object 702 and physical object 706 when rendering environment 700. The graphical images of environment 700 are captured by camera 708 along route 710 from position A to position B. At position A, physical object 706 is closer to camera 708 relative to virtual object 704 within the rendered environment, and obscures part of virtual object 704, while at position B, virtual object 704 is closer to camera 708 relative to physical object 706 within the rendered environment.

Figure 8:
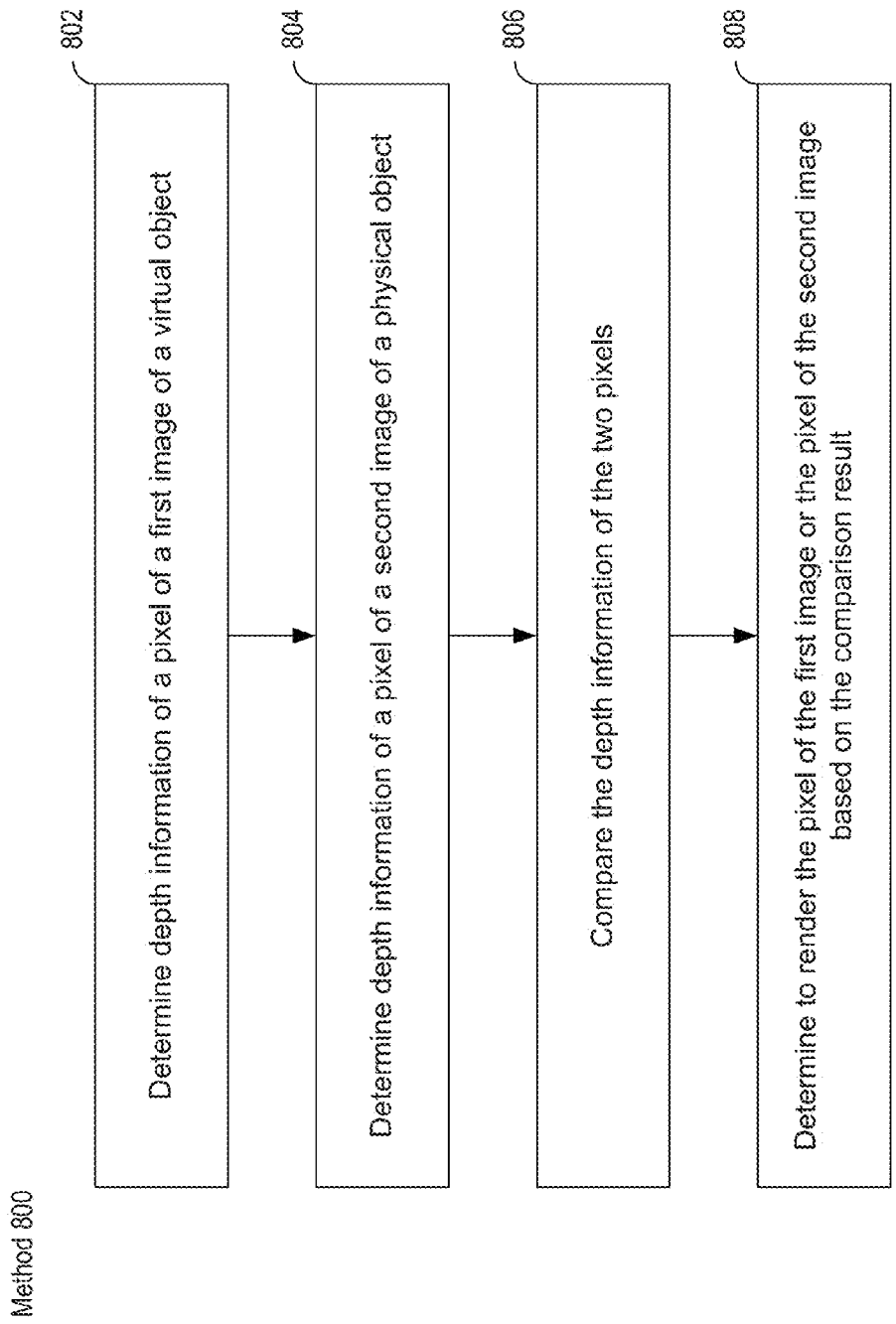
FIG. 8 is a flowchart of an exemplary method for blending of an image of 3D virtual object into real-time graphical images of a physical environment consistent with embodiments of the present disclosure.

Graphics and audio rendering module 324 can be configured to determine the rendering of virtual object 704 and physical object 706 based on their depth information, as well as a location and an orientation of the cameras. Reference is now made to FIG. 8, which is a flow chart that illustrates an exemplary method 800 for blending virtual object image with graphical images of a physical environment, consistent with embodiments of the present disclosure. While method 800 is described as being performed by a processor (e.g., graphics and audio rendering module 324), it is appreciated that method 800 can be performed by other devices alone or in combination with the processor.

In step 802, the processor can receive depth information associated with a pixel of a first image of a virtual object (e.g., virtual object 704 of FIG. 7A). The depth information can be generated based on the location and orientation of camera 708 determined by, for example, orientation and position determination module 322 of FIG. 3. For example, based on a pre-determined location of the virtual object within a 3D map and the location of the camera in that 3D map, the processor can determine the distance between the camera and the virtual object.

In step 804, the processor can determine depth information associated with a pixel of a second image of a physical object (e.g., physical object 706 of FIG. 7A). The depth information can be generated based on the location and orientation of camera 708 determined by, for example, orientation and position determination module 322 of FIG. 3. For example, based on a previously-determined location of the physical object within a 3D map (e.g., with the SLAM algorithm) and the location of the camera in that 3D map, the distance between the camera and the physical object can be determined.

In step 806, the processor can compare the depth information of the two pixels, and then determine to render one of the pixels based on the comparison result, in step 808. For example, if the processor determines that a pixel of the physical object is closer to the camera than a pixel of the virtual object (e.g., at position A of FIG. 7B), the processor can determine that the pixel of the virtual object is obscured by the pixel of the physical object, and determine to render the pixel of the physical object.

Referring back to FIG. 3, in some embodiments, graphics and audio rendering module 324 can also provide audio data for rendering. The audio data can be collected from, e.g., audio sensing system 313 (such as microphone array). In some embodiments, to provide enhanced sensory capability, some of the audio data can be magnified based on a user instruction (e.g., detected via hand gesture). For example, using microphone arrays, graphics and audio rendering module 324 can determine a location of a source of audio data, and can determine to increase or decrease the volume of audio data associated with that particular source based on a user instruction. In a case where a virtual source of audio data is to be blended with the audio signals originated from the physical environment, graphics and audio rendering module 324 can also determine, in a similar fashion as method 800, a distance between the microphone and the virtual source, and a distance between the microphone and a physical objects. Based on the distances, graphics and audio rendering module 324 can determine whether the audio data from the virtual source is blocked by the physical object, and adjust the rendering of the audio data accordingly.

After determining the graphic and audio data to be rendered, graphics and audio rendering module 324 can then provide the graphic and audio data to audio/video system 330, which includes a display system 332 (e.g., a display screen) configured to display the rendered graphic data, and an audio output system 334 (e.g., a speaker) configured to play the rendered audio data. Graphics and audio rendering module 324 can also store the graphic and audio data at a storage (e.g., storage 128 of FIG. 1), or provide the data to a network interface (e.g., network interface 140 of FIG. 1) to be transmitted to another device for rendering.

In addition, system 300 also includes a power system 340, which typically includes a battery and a power management system (not shown in FIG. 3).

Some of the components (either software or hardware) of system 300 can be distributed across different platforms. For example, as discussed in FIG. 1, computing system 100 (based on which system 300 can be implemented) can be connected to smart devices 130 (e.g., a smart phone). Smart devices 130 can be configured to perform some of the functions of processing system 320. For example, smart devices 130 can be configured to perform the functionalities of graphics and audio rendering module 324. As an illustrative example, smart devices 130 can receive information about the orientation and position of the cameras from orientation and position determination module 322, and hand gesture information from hand gesture determination module 323, as well as the graphic and audio information about the physical environment from sensing system 310, and then perform the rendering of graphics and audio. As another illustrative example, smart devices 130 can be operating another software (e.g., an app), which can generate additional content to be added to the multimedia rendering. Smart devices 130 can then either provide the additional content to system 300 (which performs the rendering via graphics and audio rendering module 324), or can just add the additional content to the rendering of the graphics and audio data.

Figures 9A, 9B:
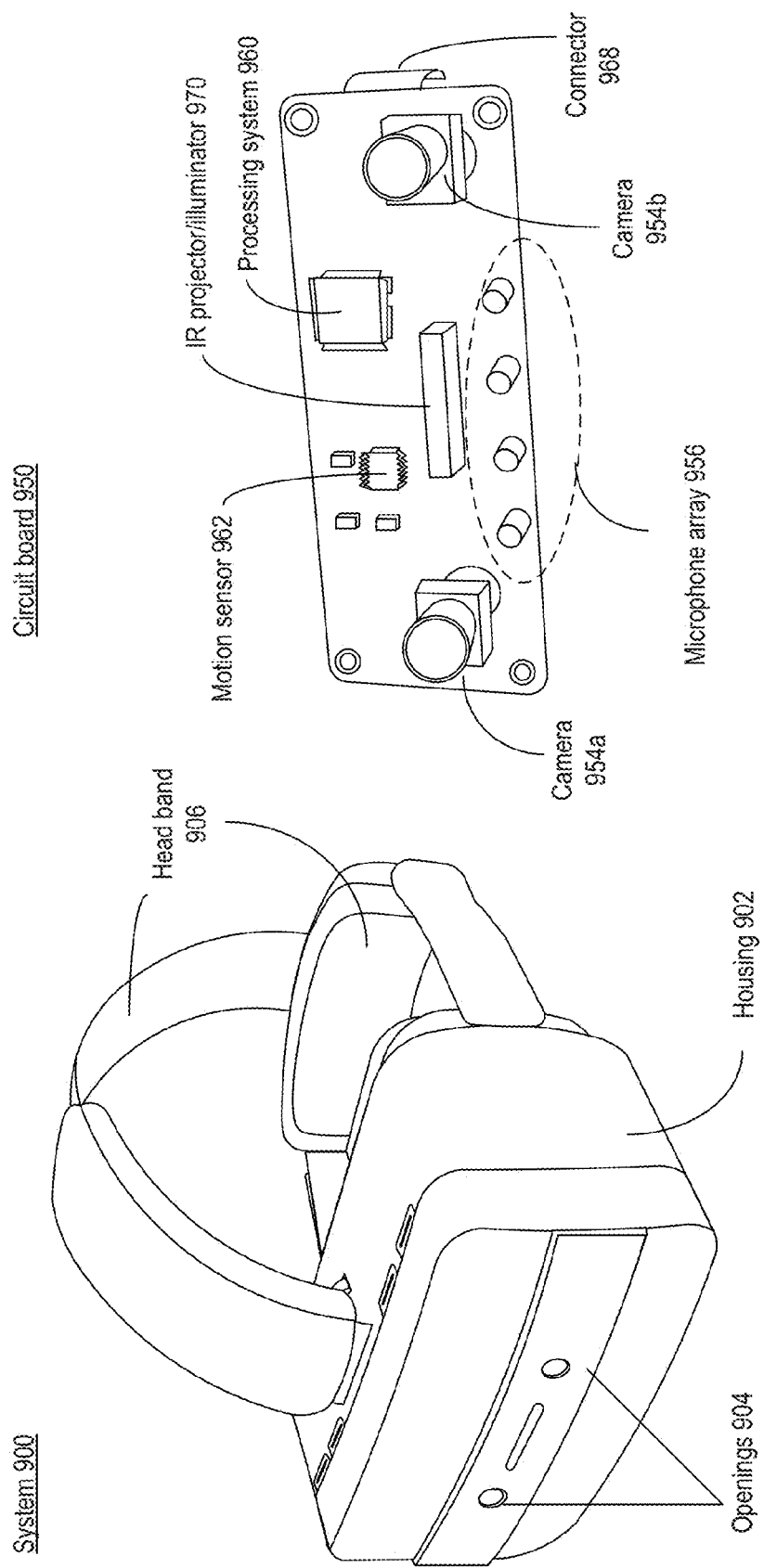
FIGS. 9A-B are schematic diagrams illustrating an exemplary head-mount interactive immersive multimedia generations system consistent with embodiments of the present disclosure.

FIGS. 9A-B are schematic diagrams illustrating an exemplary head-mount interactive immersive multimedia generations systems 900, consistent with embodiments of the present disclosure. In some embodiments, system 900 includes embodiments of computing device 100, system 300, and camera system 494 of FIG. 4F.

As shown in FIG. 9A, system 900 includes a housing 902 with a pair of openings 904, and a head band 906. Housing 902 is configured to hold one or more hardware systems configured to generate interactive immersive multimedia data. For example, housing 902 can hold a circuit board 950 (as illustrated in FIG. 9B), which includes a pair of cameras 954a and 954b, one or more microphones 956, a processing system 960, a motion sensor 962, a power management system 964, one or more connectors 968, and IR projector/illuminator 970. Cameras 954a and 954b are configured to generate graphical data of a physical environment and can each include a RGB-IR camera. Microphones 956 are configured to collect audio data from the environment to be rendered as part of the immersive multimedia data. Processing system 960 can be a general purpose processor, an FPGA, an ASIC, etc., that is configured to perform at least some of the functions of processing system 300 of FIG. 3. Connectors 968 are configured to connect system 900 to a mobile device (e.g., a smart phone) which acts as smart devices 130 of FIG. 1 to provide additional capabilities (e.g., to render audio and graphic data, to provide additional content for rendering, etc.), such that processing system 960 can communicate with the mobile device. In such a case, housing 902 also provides internal space to hold the mobile device. Housing 902 also includes a pair of lenses (not shown in the figures) and optionally a display device (which can be provided by the mobile device) configured to display a stereoscopic 3D image rendered by either the mobile device and/or by processing system 960. Housing 902 also includes openings 904 through which cameras 954 can capture images of the physical environment system 900 is located in.

As shown in FIG. 9A, system 900 further includes a set of head bands 906. The head bands can be configured to allow a person to wear system 900 on her head, with her eyes exposed to the display device and the lenses. In some embodiments, the battery can be located in the head band, which can also provide electrical connection between the battery and the system housed in housing 902.

With embodiments of the present disclosure, accurate tracking of the 3D position and orientation of a user (and the camera) can be provided. Based on the position and orientation information of the user, interactive immersive multimedia experience can be provided. The information also enables a realistic blending of images of virtual objects and images of physical environment to create a combined experience of augmented reality and virtual reality. Embodiments of the present disclosure also enable a user to efficiently update the graphical and audio rendering of portions of the physical environment to enhance the user's sensory capability.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed:

1. An apparatus, comprising:
   an optical sensing system comprising at least one camera, the at least one camera being configured to:
   acquire one or more first images of a physical environment when the apparatus is at a first orientation and/or position in the physical environment; and
   acquire one or more second images of the physical environment when the apparatus is at a second orientation and/or position in the physical environment;
   a processing system comprising:
   an orientation and position determination module configured to:
   detect one or more first salient features from the one or more first images,
   determine a first set of coordinates associated with the first salient features,
   detect one or more second salient features from the one or more second images,
   determine a second set of coordinates associated with the second salient features,
   re-project the first set of coordinates to one or more 2D spaces associated with the one or more second images,
   compare the re-projected first set of coordinates with the second set of coordinates in position closeness, feature closeness, and stereo constraints in the one or more 2D spaces to determine the one or more second salient features that correspond to the one or more first salient features, and
   determine a change between the first and second orientations and/or positions of the apparatus with respect to the physical environment based on the determined corresponding first and second detected salient features;
   and
   a rendering module configured to:
   determine a rendering of the physical environment based on the one or more first and second images and on the determined change in orientation and/or position of the apparatus, and
   provide data related to the rendering of the physical environment to a display system.

2. The apparatus of claim 1, wherein:
   the optical sensing system comprises a first camera and a second camera, the first camera being configured to acquire a first left image and a second left image of the physical environment, and the second camera being configured to acquire a first right image and a second right image of the physical environment, the first images comprising the first left image and the first right image, and the second images comprising the second left image and the second right image;
   the orientation and position determination module is configured to:
   responsive to a determination that the first and second salient features correspond to each other, determine the change in orientation and/or position of the apparatus with respect to the physical environment based on the first and second set of coordinates;
   and
   the rendering module is configured to determine a stereoscopic rendering of the physical environment based on the first and second images and on the determined change in orientation and/or position of the apparatus.

3. The apparatus of claim 2, wherein each of the first and second cameras includes red-green-blue-infra-red (RGB-IR) pixel sensors.

4. The apparatus of claim 1, wherein the optical sensing system comprises a first camera, a second camera, and a mirror, the first camera being configured to acquire an infra-red (IR) image, the second camera being configured to acquire a red-green-blue (RGB) image, and the mirror being configured to reflect IR light away from the second camera and to align the IR image with the RGB image.

5. The apparatus of claim 4, wherein the first camera is a time-of-flight camera.

6. The apparatus of claim 4, wherein the first camera is an IR camera.

7. The apparatus of claim 1, wherein the optical sensing system comprises an IR illuminator configured to project one or more patterns into the physical environments;
   wherein the detected salient features include the one or more patterns.

8. The apparatus of claim 1, wherein:
   the processing system further comprises a hand gesture determination module configured to:
   detect a hand gesture from the one or more images, and
   determine a user instruction associated with the hand gesture; and
   the rendering module is configured to determine the rendering of the physical environment based on the determined user instruction.

9. The apparatus of claim 8, wherein:
   the hand gesture determination module is configured to determine that the user instruction is associated with a selection of an object being rendered; and
   the rendering module is configured to determine a change in the rendering of the object based on the user instruction.

10. The apparatus of claim 9, wherein the object is a virtual object.

11. The apparatus of claim 9, wherein the object is a physical object present in the physical environment.

12. The apparatus of claim 1, wherein the rendering module is configured to blend an image of a virtual object with an image of a physical object located in the physical environment in the rendering of the physical environment; wherein the blending is based on a first set of coordinates associated with the virtual object and a second set of coordinates associated with the physical object.

13. The apparatus of claim 12, wherein the blending includes rendering of audio data associated with the virtual object and audio signal originated from the physical environment.

14. The apparatus of claim 1, further comprising a connector configured to connect to a smart phone.

15. The apparatus of claim 14, wherein the smart phone comprises at least part of the processing system.

16. The apparatus of claim 14, wherein:
    the smart phone is configured to provide additional content;

and the rendering module is configured to determine a rendering of the physical environment based on the one or more images and the additional content.

17. A system, comprising:
a processor; and
a non-transitory computer-readable storage medium storing instructions that, when executed by the processor, cause the system to:
acquire one or more first images of a physical environment when the system is at a first orientation and/or position in the physical environment,
detect one or more first salient features from the one or more first images,
determine a first set of coordinates associated with the first salient features,
acquire one or more second images of the physical environment when the apparatus is at a second orientation and/or position in the physical environment,
detect one or more second salient features from the one or more second images,
determine a second set of coordinates associated with the second salient features,
re-project the first set of coordinates to one or more 2D spaces associated with the one or more second images,
compare the re-projected first set of coordinates with the second set of coordinates in position closeness, feature closeness, and stereo constraints in the one or more 2D spaces to determine the one or more second salient features that correspond to the one or more first salient features,
determine a change between the first and second orientations and/or positions of the apparatus with respect to the physical environment based on the determined corresponding first and second detected salient features,
determine a rendering of the physical environment based on the one or more first and second images and on the determined change in orientation and/or position of the apparatus, and
provide data related to the rendering of the physical environment to a display system.

18. The system of claim 17, wherein the instructions further cause the system to:
detect a hand gesture from the one or more images;
determine a user instruction associated with the hand gesture; and
determine the rendering of the physical environment based on the determined user instruction.

19. A method, comprising:
acquiring one or more first images of a physical environment when the system is at a first orientation and/or position in the physical environment;
detecting one or more first salient features from the one or more first images;
determining a first set of coordinates associated with the first salient features;
acquiring one or more second images of the physical environment when the apparatus is at a second orientation and/or position in the physical environment;
detecting one or more second salient features from the one or more second images,
determining a second set of coordinates associated with the second salient features,
re-projecting the first set of coordinates to one or more 2D spaces associated with the one or more second images,
comparing the re-projected first set of coordinates with the second set of coordinates in position closeness, feature closeness, and stereo constraints in the one or more 2D spaces to determine the one or more second salient features that correspond to the one or more first salient features,
determining a change between the first and second orientations and/or positions of the apparatus with respect to the physical environment based on the determined corresponding first and second detected salient features;
determining a rendering of the physical environment based on the one or more first and second images and on the determined change in orientation and/or position of the apparatus; and
providing data related to the rendering of the physical environment to a display system.

20. The method of claim 19, further comprising:
detecting a hand gesture from the one or more images;
determining a user instruction associated with the hand gesture; and
determining the rendering of the physical environment based on the determined user instruction.

* * * * *